Aug. 4, 1925.
W. A. ADAMS
1,548,238
SUPPORT FOR ELECTRIC LAMPS
Filed March 7, 1922
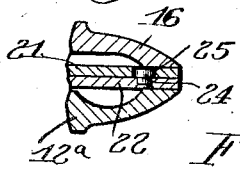
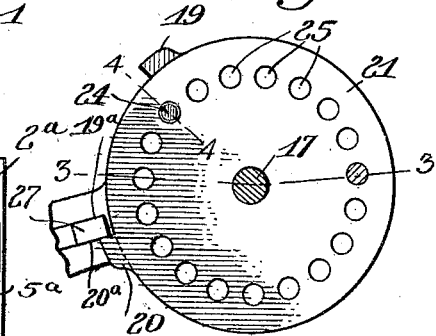
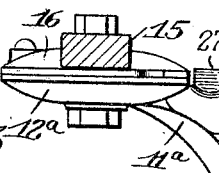
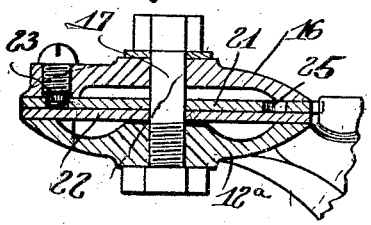
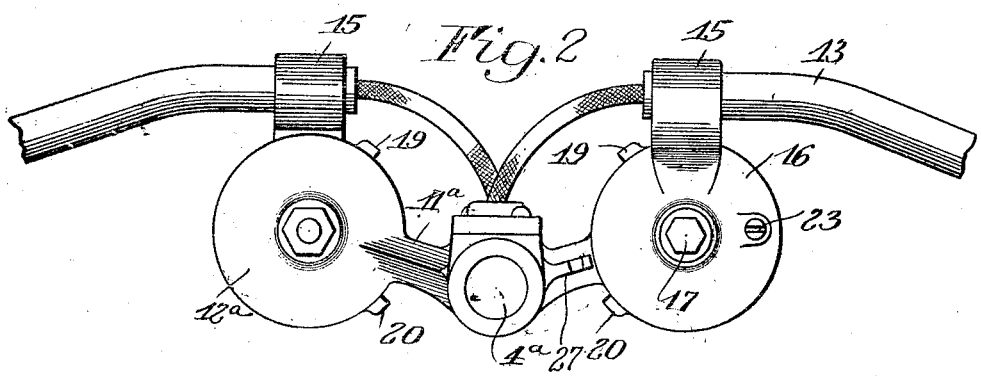
INVENTOR.
Walter A. Adams
BY
his ATTORNEYS.

Patented Aug. 4, 1925.

1,548,238

UNITED STATES PATENT OFFICE.

WALTER A. ADAMS, OF ROCHESTER, NEW YORK.

SUPPORT FOR ELECTRIC LAMPS.

Application filed March 7, 1922. Serial No. 541,794.

*To all whom it may concern:*

Be it known that I, WALTER A. ADAMS, a citizen of the United States, and resident of Rochester, in the county of Monroe and State of New York, have invented certain new and useful Improvements in Supports for Electric Lamps, of which the following is a specification.

The present invention relates to supports for electric lamps and an object thereof is to combine with an adjustable lamp supporting member, means for limiting the adjustment about a suitable axis, such means being adjustable to vary the amount of adjustment and also adjustable to vary the field of movement.

To these and other ends, the invention consists of certain parts and combinations of parts, all of which will be hereinafter described: the novel features being pointed out in the appended claims.

In the drawings:

Fig. 1 is a plan view of one embodiment of the invention with parts removed;

Fig. 2 is a side view of the embodiment of the invention shown in Fig. 1;

Fig. 3 is a section on the line 3—3, Fig. 5;

Fig. 4 is a section on the line 4—4, Fig. 5; and

Fig. 5 is a detail view of the adjustable limiting means.

In the embodiment of the invention illustrated, the box $2^a$ is horizontally arranged and has at one or both ends an opening $4^a$ with which the conduit 1 may connect in order to lead a conductor wire through and out at both ends of the outlet box $2^a$. The outlet box has but one cover member $5^a$ which is provided with two openings in which two bushings $8^a$ of non-conducting material are arranged. Projecting from opposite sides of the box and preferably from opposite ends thereof, are two rigid and, in this instance, integral arms $11^a$ each of which has at its outer end a side disk-like and vertically arranged member $12^a$. The lamp carrying member comprises a tubular member 13 connecting with the lamp socket and passed through the laterally extending sleeve 15 on the vertically arranged disk 16, a bolt 17 connecting this disk with the disk $12^a$.

With the end in view of limiting the movement of the lamp carrying member two stops 19 and 20 are provided arranged respectively on disks 21 and 22 positioned between the disks $12^a$ and 16 about the pivoted bolt 17. These disks are adjustable relatively to each other and are also adjustable relatively to the disk 16 of the bracket carrying member but are connected with the latter so as to swing therewith. To this end the disk 16 of the bracket carrying member has a screw 23 which passes through anyone of an annular series of openings formed in the disk 21, said annular series of openings being concentric with the axis of turning of the disk 16. The disk 22 carries a pin or projection 24 which is also adapted to extend through anyone of the openings 25 for the purpose of establishing a fixed relationship between the two disks, while at the same time permitting an adjustment of the stops 19 and 20. This adjustment is effected by loosening the bolt 17 and moving the disks outwardly with reference to each other until the desired distance between the stops 19 and 20 is secured after which the two disks 21 and 22 are moved into contact so that the projection 25 enters in one of the openings 24. The relationship between the bracket carrying member and the stops 19 and 20 is established by adjusting the screw 23 so as to withdraw it from the opening 24 after which the disk will turn until the desired opening 24 is opposite the screw 23 when the latter may be turned to pass through the opening and lock the two disks to the disk 16. For cooperating with the stops 19 and 20 two abutments $19^a$ and $20^a$ are provided on a lug 27 which is preferably formed integrally with the bracket arm $11^a$.

From the foregoing it will be noted that there has been provided an adjustable limiting means for the bracket arm, this limiting means permitting the amount of swinging of the arm to be varied and, at the same time, permitting the field of said swinging movement to be shifted.

What I claim as my invention and desire to secure by Letters Patent is:

1. The combination with two bracket members pivotally connected together, of means for limiting the relative movement of said members embodying two abutments on one of the members, and two abutments connected with the other member and lying on opposite sides of the first two mentioned abutments, the second mentioned abutments being adjustable relatively to the member by which they are carried so that the field of the swinging movement may be changed and being also adjustable relatively to each other so that the range of the swinging movement may be varied.

2. The combination with two bracket members pivotally connected together, of means for limiting the relative movement of said members embodying two abutments on one of said parts, and two abutments connected with the other part to move with the latter, said two abutments operating on the opposite sides of the first two abutments and being adjustable relatively to each other to vary the range of the swinging movement.

3. The combination with two bracket members pivotally connected together, of means for limiting the relative movement of said members embodying two abutments on one of the members, and two disks adjustably connected to the other member and also adjustable relatively to each other, both adjustments being about the axis of turning of the two members each disk being provided with an abutment adapted to cooperate with the two first mentioned abutments.

4. The combination with two members having relative movement about a suitable axis, of means for limiting the relative movement of the said two members about said axis embodying two abutments on one of the members two disks mounted to turn about the axis of turning, one of said disks being provided with an annular series of openings concentric with the axis of turning, two abutments one on each of the disks adapted to cooperate with the first two mentioned abutments, means carried by one of the members and adapted to fit in any one of the openings to vary the position of said disk with reference to said member, and means carried by the other disk and adapted to fit in any one of said openings to vary the position of the last mentioned disk with reference to the first mentioned disk.

WALTER A. ADAMS.